United States Patent Office
3,632,610
Patented Jan. 4, 1972

3,632,610
PROCESS FOR THE PRODUCTION OF 5-NITRO-1,4-DIHYDROXY-ANTHRAQUINONE
Reinold Schmitz, Blecher Uber Bergisch-Gladbach, Heinrich Leister, Cologne-Stammheim, and Hans-Samuel Bien, Burscheid, Germany, assignors to Farbenfabriken Bayer Aktiengesellschaft, Leverkusen, Germany
No Drawing. Filed Oct. 2, 1967, Ser. No. 672,026
Claims priority, application Germany, Oct. 6, 1966, F 50,370
Int. Cl. C07b 1/10; C07c 79/36
U.S. Cl. 260—351                                4 Claims

ABSTRACT OF THE DISCLOSURE 5-nitro-1,4-dihydroxy-anthraquinone is produced by nitrating 1-hydroxy-10-chloroanthraquinone (4,9) in an inorganic acid solvent and hydrolyzing the resultant 1-hydroxy-5-(or 8-)nitro-10-chloro-anthraquinone-(4,9).

This invention relates to 5-nitro-1,4-dihydroxy-anthraquinone. It is known that 5-nitro-1,4-dihydroxy-anthraquinone can be obtained by heating a mixture of 1,5- and 1,8-dinitroanthraquinone in nitrite-containing borosulphuric acid at about 200° C. (cf. German Patent No. 90,041). However, according to such process, 5-nitro-1,4-dihydroxy-anthraquinone is obtained only in a low yield and with an insufficient degree of purity.

According to the present invention, 5-nitro-1,4-dihydroxyanthraquinone is obtained in a good yield and with a high degree of purity by nitrating 1-hydroxy-10-chloroanthraquinone-(4,9) in an inorganic acid solvent to give 1-hydroxy-5-(or 8) nitro-10-chloroanthraquinone-(4,9), and hydrolising the latter in known manner to give 5-nitro-1,4-dihydroxy-anthraquinone.

The 1-hydroxy-10-chloro-anthraquinone-(4,9), Green's substance, can be prepared, for example, by prolonged heating of quinizarin with thionyl chloride (A. Green, Journal of the Chemical Society, 1926, p. 1431).

Examples of inorganic acids used in the present process are sulphuric acid which can contain $SO_3$, chlorosulphonic acid, nitric acid, and mixtures thereof. Boric acid is advantageously also present. The concentration of the solutions can be varied within wide limits, but is generally carried out in a 3- to 15-fold amount of solvent, advantageously in the presence of a ½- to 1-fold amount of boric acid, all based on the weight of the starting material. The nitric acid can be used for the nitration in the stoichiometric amount or in a small (about 10–30%) excess.

The temperature during nitration should be kept as low as possible since, from about 20° C. onwards, the hydrolysis of 1-hydroxy-10-chloro-anthraquinone-(4,9) forming quinizarin takes place as an interfering side reaction. Consequently, temperatures of about —15° C. to about +15° C. are preferred.

The hydrolysis of 1-hydroxy-5-(or 8-)nitro-10-chloro-anthraquinone-(4,9) to give the 5-nitro-1,4-dihydroxy-anthraquinone is preferably carried out in boric acid-containing sulphuric acid. It may be effected either after isolating the intermediate product or, advantageously, without isolation immediately following the nitration. For this purpose, the reaction mixture is stirred, e.g. after completion of the nitration, either for a prolonged time at a low temperature (e.g. at +10° C. for 24 hours), or it is heated at 70–80° C. for a short time. The excess of nitric acid present can previously be destroyed by a suitable reducing agent, e.g. hydrazinium hydrogen sulphate.

After conventional working up, a crude product, which contains about 90% 5-nitro-1,4-dihydroxy-anthraquinone, is obtained in a satisfactory yield.

It is surprising and could not be foreseen that 1-hydroxy-10-chloro-anthraquinone-(4,9) can be nitrated in such a smooth manner without oxidation, in particular, since it is known from German Pat. No. 272,299 that 1,4-dihydroxy-anthraquinone itself yields 3-nitro-1,2,4,trihydroxy-anthraquinone by nitration in sulphuric acid with oxidation, but cannot be nitrated at all in boric acid-containing sulphuric acid.

5-nitro-1,4-dihydroxy-anthraquinone prepared according to the process described above is a valuable intermediate for dyestuffs. It can be reduced in known manner, e.g. with sodium sulphide, to give 5-amino-1,4-dihydroxy-anthraquinone which, in turn, is a valuable intermediate product.

The parts and percentages given in the examples are parts by weight, the temperatures are given as degrees centigrade (° C.).

This intermediate product can be employed to produce known dyestuffs as described in U.S. Pat. 2,053,273.

Example 1

50 parts 1-hydroxy - 10 - chloro - anthraquinone-(4,9) [Green's substance containing about 3% quinizarin] are introduced at —10° to 0° within 30 minutes into a solution of 30 parts boric acid in 460 parts sulphuric acid (96%) and dissolved. 57 parts of a mixed acid 28% $HNO_3$, 56% $H_2SO_4$, 16% $H_2O$ are then allowed to run into the solution at below 0°, the mixture is cooled to —10° and stirred at this temperature for two hours. 10 parts hydrazine sulphate are added at below 0° to decompose the nitric acid, the mixture is heated within 4 hours up to 80° and this temperature is maintained for 30 minutes. The melt is diluted with 1000 parts water, briefly heated to boiling temperature, filtered off with suction while hot, and washed with hot water until neutral. After drying, 54 parts 5-nitro-1,4-dihydroxy-anthraquinone are obtained which, besides about 3% 1,4-dihydroxy-anthraquinone, still contains a small amount of 6-nitro-1,4-dihydroxy-anthraquinone. If the process is carried out according to this example, but without the addition of hydrazine sulphate, then a crude product is obtained in the same quantity which additionally contains a small amount of 2-(or 3-) chloro-5-nitro-1,4-dihydroxy-anthraquinone as impurity.

Example 2

20 parts 1-hydroxy - 10 - chloro-anthraquinone-(4,9) (Green's substance containing about 3% quinizarin) are introduced at between —10° and —5° into a solution of 10 parts boric acid in 75 parts nitric acid (96%). The mixture is cooled to —10° and kept at this temperature for one hour. The melt is poured on to 500 parts of ice, the product is filtered off with suction and washed with water until the reaction is neutral. After drying, there are obtained 21 parts 1-hydroxy-5-(or 8-)nitro-10-chloro-anthraquinone-(4,9) which yields by heating at 80° for 30 minutes in 150 parts 10% boric acid, after working up as described above in Example 1, 19.5 parts 5-nitro-1,4-dihydroxy-anthraquinone.

Example 3

50 parts 1-hydroxy - 10 - chloro - anthraquinone-(4,9) [Green's substance containing about 3% quinizarin] are introduced at —10° to 0° into 460 parts sulphuric acid (96%), 57 parts of a mixed acid (28% $HNO_3$, 56% $H_2SO_4$, 16% $H_2O$) are then added dropwise at below 0° within 20 minutes, and stirring is continued at 0° for 20 minutes. The reaction mixture is stirred into 1000 parts of water, the product is filtered off with suction, washed until neutral and dried. There are obtained 55 parts 1-hydroxy-5-(or 8-)nitro-10-chloro-anthraquinone - (4,9) which yield, after hydrolysis in boric acid-containing sulphuric acid according to Example 2, 49 parts 5-nitro-1,4-dihydroxy-anthraquinone.

What is claimed is:

1. A compound selected from the group consisting of 1-hydroxy-5-nitro - 10 - chloroanthraquinone-(4,9) and 1-hydroxy-8-nitro-10-chloroanthraquinone-(4,9).

2. A process for the production of 5-nitro-1,4-dihydroxy-anthraquinone comprising, in sequence, the steps of:
    (A) nitrating, at a temperature of about $-15°$ C. to about $+15°$ C., 1-hydroxy-10-chloroanthraquinone-(4,9) in an inorganic acid solvent selected from sulfuric acid, sulfuric acid containing $SO_3$, chlorosulfonic acid, nitric acid and mixtures thereof, to yield 1-hydroxy-5-(or 8-) nitro-10-chloroanthraquinone-(4,9); and
    (B) hydrolising the 1-hydroxy-5-(or 8-) nitro-10-chloroanthraquinone-(4,9) to 5-nitro - 1,4 - dihydroxy-anthraquinone.

3. Process of claim 2 wherein the inorganic acid contains boric acid.

4. Process of claim 2 wherein the hydrolising is conducted in the presence of sulphuric acid which contains boric acid.

References Cited

UNITED STATES PATENTS 3,082,218  3/1963  Buxbaum et al. _____ 260—380

OTHER REFERENCES

Green, J. Chem. Soc., 1926, p. 1431.

LEWIS GOTTS, Primary Examiner

R. GERSTL, Assistant Examiner

U.S. Cl. X.R.

260—380, 383